C. H. WILLIAMS, Jr.
BRAKE BEAM.
APPLICATION FILED JAN. 17, 1910.
979,624.
Patented Dec. 27, 1910.
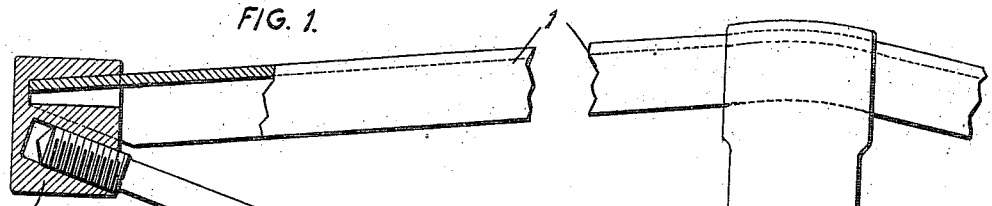
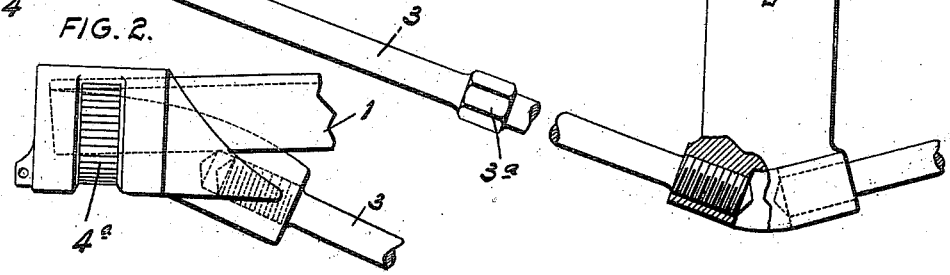
WITNESSES
INVENTOR
CHARLES H. WILLIAMS JR.

UNITED STATES PATENT OFFICE.

CHARLES H. WILLIAMS, JR., OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-BEAM.

979,624.

Specification of Letters Patent.

Patented Dec. 27, 1910.

Application filed January 17, 1910. Serial No. 538,469.

*To all whom it may concern:*

Be it known that I, CHARLES H. WILLIAMS, Jr., a citizen of the United States, residing at Chicago, Illinois, have invented a certain new and useful Improvement in Brake-Beams, of which the following is a full, clear, and exact description, such as will enable others skilled in the art to which it appertains to make and use the same, reference being had to the accompanying drawings, forming part of this specification, in which—

Figure 1 is a plan view, partly in section, of a portion of my improved brake beam. Fig. 2 is a plan view of a modified form of beam.

My invention relates to a new and useful improvement in brake beams, and particularly the tension members of such beams and the manner of securing said tension members in position and placing tension therein.

In the drawings, 1 indicates the compression member of a trussed brake beam.

2 is a strut, which, as shown in Fig. 1, is provided with threaded openings in its lower end.

3 is the tension member threaded at each end and screwed into the lower end of the strut and into the thrust block 4, against which latter the compression member is seated. This thrust block provides a seat for the brake head. The tension member is provided with a non-circular portion 3ª, by which the same may be turned, and as its ends are provided with right and left hand threads, it is obvious that said tension member, upon being turned, will tighten up the trussed structure and place a camber in the compression member.

In Fig. 2, I have shown a modified form of thrust block, in which there is provided a series of teeth 4ª for coöperating with the locking block of an adjustable brake head of well known design. The thrust block in this form is also provided with an inwardly extending saddle-like projection for receiving the threaded end of the tension member. In this manner the thrust block can be made solid for use in connection with heavier compression and tension members, where it is desired to secure great rigidity in the beam.

I claim:

1. In a brake beam, a tension member having right and left hand threads, whereby it may be turned to place camber in the compression member.

2. In a brake beam, the combination of a compression member, thrust block, a strut, and a tension member composed of sections, each of which has right and left hand threads at its ends respectively, said ends having threaded engagement with said thrust blocks and said strut.

3. In a brake beam, the combination of a compression member, a thrust block arranged thereon and having an inward extension in line with the tension member, said inwardly extending portion being provided with a threaded socket, and a tension member threaded into said socket.

In testimony whereof I hereunto affix my signature in the presence of two witnesses, this 12th day of January, 1910.

CHARLES H. WILLIAMS, JR.

Witnesses:
 EDWARD T. WALKER,
 M. F. HUNTOON.